UNITED STATES PATENT OFFICE.

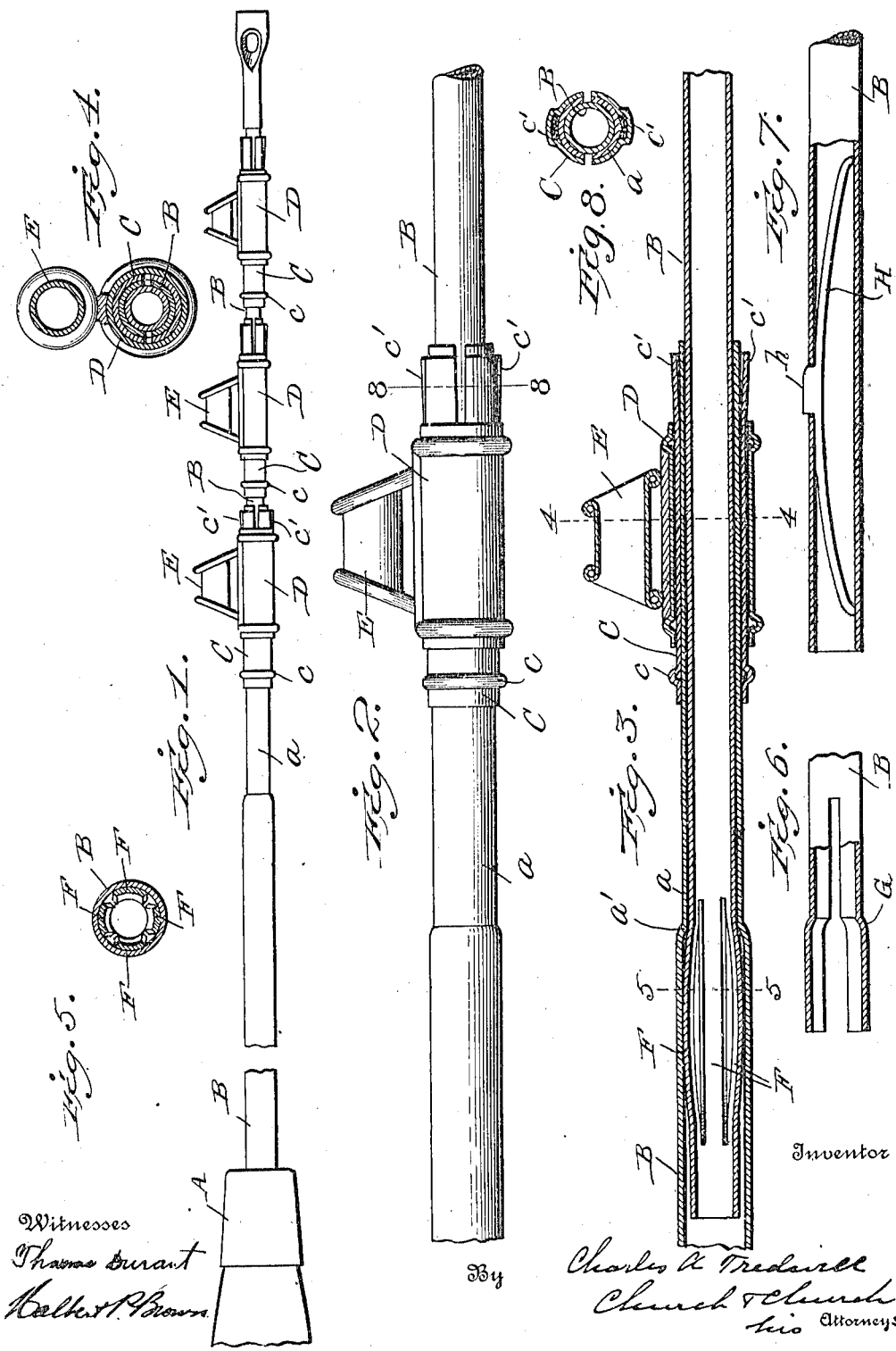

CHARLES A. TREDWELL, OF BRISTOL, CONNECTICUT, ASSIGNOR TO THE HORTON MANUFACTURING COMPANY, OF BRISTOL, CONNECTICUT, A CORPORATION OF CONNECTICUT.

TELESCOPIC FISHING-ROD.

1,064,030.     Specification of Letters Patent.     Patented June 10, 1913.

Application filed August 24, 1911. Serial No. 645,716.

*To all whom it may concern:*

Be it known that I, CHARLES A. TREDWELL, a citizen of the United States, residing at Bristol, in the county of Hartford and State of Connecticut, have invented certain new and useful Improvements in Telescopic Fishing-Rods; and I do hereby declare the following to be a full, clear, and exact description of the same, reference being had to the accompanying drawings, forming part of this specification, and to the figures and letters of reference marked thereon.

This invention relates to fishing rods of that type wherein the body of the rod is formed of sections mounted to telescope one within the other so as to be capable of being reduced to a short compact structure, or of being extended to a considerable length when ready for use, the objects of the invention being to provide an improved construction and arrangement of the telescopic sections whereby they will be held in their relatively adjusted positions. In the preferred form the sections are adapted for complete separation, and when desired, are constructed to permit of the substitution of different line guides.

The invention consists in certain novel details of construction, all of which will be hereinafter described and pointed out particularly in the appended claims.

Referring to the accompanying drawings,—Figure 1 is an elevation of a fishing rod embodying the present improvements with the sections in their contracted positions but with portions broken away, in order to illustrate the parts on a larger scale; Fig. 2 is a similar view of the outer end of one of the outer sections showing the clamp or locking mechanism for the inner section on an enlarged scale; Fig. 3 is a section in a longitudinal plane through the parts shown in Fig. 2, the inner section in this view being in an extended position; Fig. 4 is a section in a transverse plane on the line 4—4 of Fig. 3; Fig. 5 is a section in a plane indicated by the line 5—5, Fig. 3; Figs. 6 and 7 are elevations partly in section showing different constructions of the inner ends of the inner sections of the rod designed to create friction for preventing the too free movements of the sections and to afford stops for limiting the outward movement of the inner sections, said stops however having the capacity for forcible contraction when it is desired to entirely separate the sections; Fig. 8 is a transverse section on the line 8—8 of Fig. 2.

Like letters of reference in the several figures indicate the same parts.

A handle A of the present rod is of any usual construction, but is preferably of the reversible type, that is to say, having sockets in each end for the reception of the inner end of the butt section of the body of the rod. The sections B of the rod are preferably made of thin tubes of steel, one adapted to telescope into the other, and the number of sections is determined at the option of the manufacturer or in accordance with the size and use to which the rod it to be put.

Each of the sections into which another section telescopes is provided at its outer end with a releasable clamp for gripping the inner section, whereby the inner section may be moved to the desired position and there clamped securely against accidental displacement in the outer section. In the preferred construction the clamp is formed by splitting the outer section and affixing thereon a split ferrule C, the arms of the ferrule and the arms of the split end of the section being united to form the clamping arms for gripping the inner section. The base or inner end of the ferrule is preferably a complete cylinder which tightly embraces the body of the rod so as to strengthen the same, and it is provided with a bead or shoulder c which serves to limit the inward sliding movement of a sleeve D which is applied to the ferrule and is adapted, when moved in one direction, to force the clamping arms toward each other, so as to effect the clamping or gripping action.

In the preferred construction the arms of the ferrule are provided with inclined or divergent faces formed by wedge-shaped offsets c' with which the sliding sleeve coöperates when moved outwardly or toward the end of the section, but the dimensions of these parts are preferably such that when there is no inner section of the rod present, the sliding sleeve may be forcibly withdrawn from the ferrule to permit of the substitution of a new or different sleeve, this function being especially desirable, inasmuch as the sliding sleeve is usually utilized as the carrier for the line guide E, and it often becomes desirable to substitute a different kind or size of line guide best adapted for the kind and quality of line being used.

In order to provide sufficient friction for preventing the sections from sliding one within the other too freely, a friction member is usually applied to the inner end of each section, which friction member by expansion contacts with the inner face of the outer section. As shown in Figs. 3 and 5, the inner end of the inner section is split longitudinally at a point or points slightly removed from the ends and the portions F between the splits are bowed outwardly or spread apart so as to form bow springs which will frictionally engage the inner face of the outer section. Although this construction is for some reasons to be preferred, it is obvious that the same result may be secured with the constructions illustrated in Figs. 6 and 7. In Fig. 6, for instance, the extreme end of the inner section is split and bulged outwardly at G, and in Fig. 7 a bow spring H is mounted in the inner section and provided with an outwardly extending projection $h$ adapted to pass through an aperture in the inner section and engage the inner face of the outer section.

In addition to its function of providing friction for the purpose stated, the friction member on the inner end of the inner section is utilized as one of the stops for limiting or determining the outward movement of the inner section, and with this object in view, as well as to provide an effectual cylindrical bearing for the inner section, the outer ends of the outer sections are reduced in diameter as at $a$, thereby forming the cylindrical bearing for the inner section and an internal shoulder $a'$ against which the friction member on the inner section will come to rest, and afford a considerable resistance to further outward movement of the inner section. Should it be desired, however, to separate the two sections, this resistance may be overcome by forcible withdrawal of the inner section, sufficient force being necessary, of course, to overcome the spring resistance of the friction member and draw the same past the shoulder on the outer section. When so separated the sliding sleeve of the clamp on the outer section may be removed, as before explained, and after the substitution of a new sleeve the sections may be again united by forcing the inner section into the outer section until the friction member passes the cylindrical portion of the outer section and enters the portion of a larger diameter beyond the shoulder $a'$.

With a rod embodying the present invention, the sections may be firmly clamped or locked in either their contracted or extended positions so as to be securely held against accidental relative displacement, thereby overcoming to a large extent one of the objections to the telescopic type of rod and insuring the retention of the sections in their proper extended position, even under the most active and violent use to which the rod may be subjected. This construction, furthermore, strengthens the meeting ends of the sections, and insures a tight and firm joint, even though the rod may have been subjected to long use and wear.

Having thus described my invention, what I claim as new and desire to secure by Letters Patent of the United States, is:

1. A fishing rod embodying a plurality of tubular metal sections telescoping one within the other, one end of the external tube being split and provided with inclined faces diverging toward the end of the tube, stops for limiting the outward movement of the internal section, and a sliding sleeve surrounding the said split end and adapted to coöperate with said inclines to clamp the split end upon the internal section, lock the sections against relative movement and prevent the spreading of the split end when the rod is flexed.

2. A fishing rod embodying a plurality of tubular metal sections telescoping one within the other, one end of the external tube being split and of reduced diameter, and provided with inclined outer faces diverging toward the end of the tube, an enlargement on the internal section for coöperation with the reduced end of the external section to limit relative movement of the sections in one direction and a sliding sleeve surrounding the said split end and adapted to coöperate with the inclines to clamp the split end upon the internal section, lock the sections against relative movement and prevent the spreading of the split end when the rod is flexed.

3. A fishing rod embodying a plurality of tubular metal sections telescoping one within the other, the outer end of the external section being split, and having external inclined faces diverging toward the end of the section, and the inner end of the internal section being provided with a radially yielding friction member engaging the inside of the external section, and a sliding sleeve surrounding the split end of the external section and coöperating with the inclined faces to clamp the split end on the internal section.

4. A fishing rod embodying a plurality of tubular metal sections telescoping one within the other, the outer end of the external section being split, a ferrule having one end split permanently affixed on the split end of the external section and having its split end formed with inclines, and a sliding sleeve mounted on said ferrule and coöperating with the inclines to clamp the split end of the external section on the internal section.

5. A fishing rod embodying a plurality of tubular metal sections telescoping one within the other, the outer end of the external section being reduced in diameter and split, a ferrule permanently affixed on said split end, and having its end split to correspond with the split end of the section, said ferrule being of greater length than the split in the section and having inclines formed thereon, a sleeve slidably mounted on the ferrule and coöperating with the inclines to clamp the split end on the internal section.

6. A fishing rod embodying a plurality of tubular metal sections telescoping one within the other, one end of the external section being split and having an internal shoulder and external inclines diverging toward the end of the section, and the internal section having a radially yielding friction member adapted to coöperate with the shoulder in the external section to check the outward movement of the section and to yield and pass said shoulder to permit the forcible separation of the sections, and a sleeve surrounding and movable longitudinally on the split end of the external section for clamping said end on the internal section, said sleeve and split end being of such proportions that the sleeve may be removed from the split end when the internal section is not in place within the split end.

CHARLES A. TREDWELL.

Witnesses:
PAUL C. BALDWIN,
CHARLES S. JOY.